Dec. 17, 1957     W. VAN B. ROBERTS     2,817,081
TRACKING SYSTEM

Filed Jan. 10, 1955                                     2 Sheets-Sheet 1

INVENTOR
WALTER VAN B. ROBERTS

BY

ATTORNEYS

Dec. 17, 1957   W. VAN B. ROBERTS   2,817,081
TRACKING SYSTEM
Filed Jan. 10, 1955   2 Sheets-Sheet 2

INVENTOR
WALTER VAN B. ROBERTS

BY
ATTORNEYS 2,817,081
Patented Dec. 17, 1957

2,817,081

TRACKING SYSTEM

Walter Van B. Roberts, Princeton, N. J., assignor to the United States of America Application January 10, 1955, Serial No. 481,049

1 Claim. (Cl. 343—9)

This invention relates generally to radio object locating systems, and more particularly to object speed and course determining systems.

Information as to the velocity and flight path of airborne objects is essential in evaluating the design thereof. Such information must be obtained from the ground in tests of single flight devices such as rockets and guided missiles unless instruments and telemetering equipment are to be sacrificed on each flight. Furthermore, many such devices are too small to carry this equipment. It has been the practice to obtain such information by tracking the object with pulse radars such as the SCR–584. However, because a radar receiver must remain inoperative until after the termination of the transmitted pulse, tracking information can not be obtained while the object is at close range. A further disadvantage attends the use of tracking radars because of the radar's inability to distinguish a rocket or missile proper from such temporary accompanying structure as a carriage or booster. For example, when a rocket separates from its carriage in mid-flight, the radar is as likely to track the falling rocket carriage as it is the rocket itself.

Therefore, it is an object of this invention to provide an object speed and course determining system overcoming the above disadvantages.

It is a further object of this invention to provide a precision object speed and course determining system operable over an extended range.

It is a further object of this invention to provide an object speed and course determining system for rockets and the like which will distinguish the rocket from its carriage.

It is a further object of this invention to provide an object speed and course determining system having a plurality of spatially dispersed receivers and a transmitter tuned to resonate with a dimension of the object being measured.

Other objects and many of the attendant advantages of this invention will be readily appreciated as the same becomes better understood by reference to the following detailed description when considered in connection with the accompanying drawings wherein.

Briefly, this invention permits precision speed and trajectory measurements of rockets and other high speed devices by means of a continuous wave transmitter and plurality of spatially dispersed receivers remotely located with respect to the rocket launcher. The respective antennae of the transmitter and each receiver are suitably disposed to permit the transmitter to illuminate the rocket with most of its energy but to permit a small amount of energy to reach each receiver directly from the transmitter. In addition, each receiving antenna receives energy reflected from the rocket. The ripple frequency in each receiver produced by the direct and reflected transmitter energy received thereby is dependent upon the speed of the rocket and its relative bearing with respect to the transmitter and said receiver. A comparison of the ripple frequencies appearing simultaneously at each of the receivers provides data for computing the speed and course of the rocket at any instant.

Figure 1:
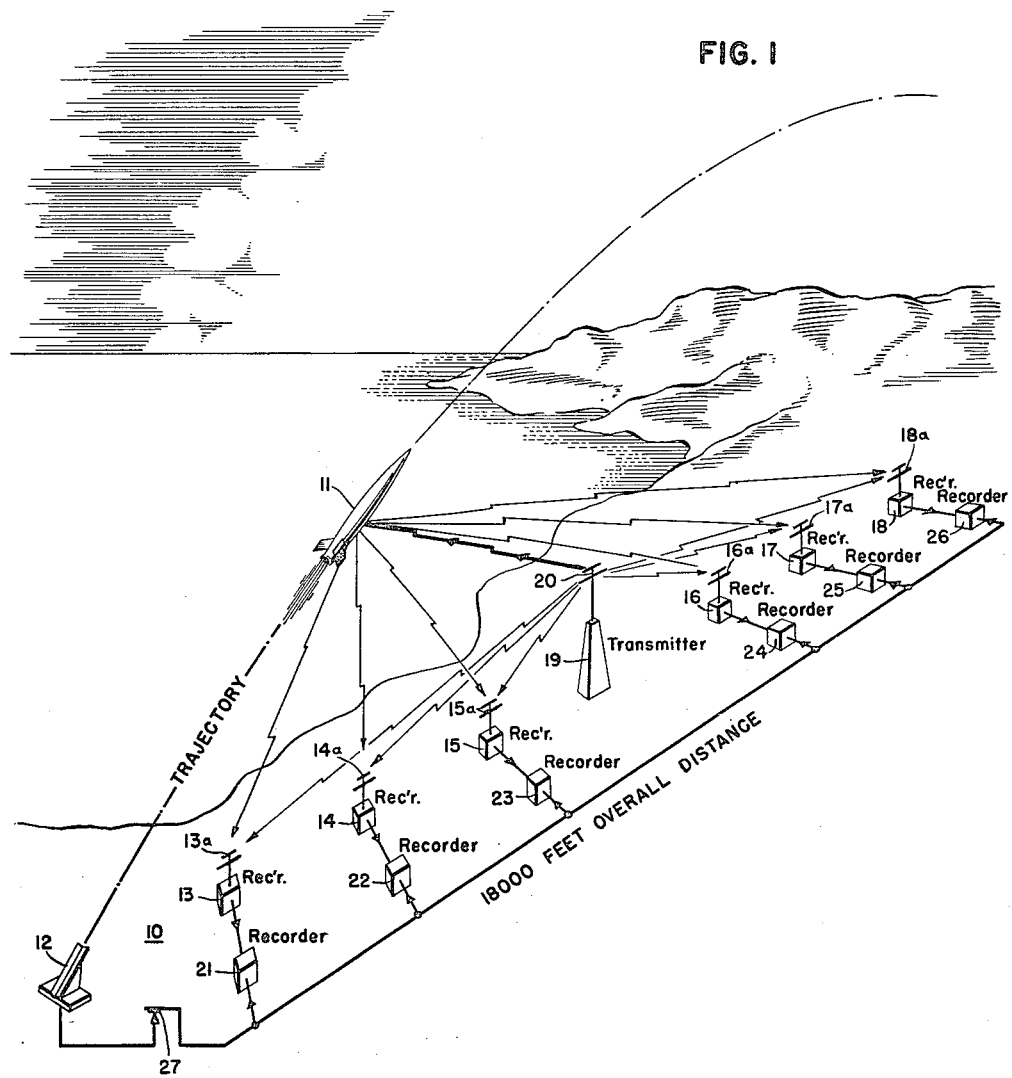
Fig. 1 is a perspective diagram of the entire system of this invention.

For a detailed consideration of this invention, reference is now made to Fig. 1. Fig. 1 shows a perspective view of a system according to this invention including a rocket launcher shown with a rocket in flight. A rocket launcher is indicated at 12 at the left and six receivers designated 13 through 18 are shown distributed along the ground 10 substantially under the rocket trajectory. Centrally disposed with respect to the receivers is shown a transmitter 19. The transmitter 19 is shown connected to an antenna 20 having no directional characteristics with respect to the rocket trajectory. The antenna may take any form which will produce an electric field at the rocket which has a considerable component parallel to the rocket axis in all parts of the rocket trajectory. Thus the antenna must not only be horizontally polarized but must also be oriented or rotated in the horizontal plane so that the electric field is parallel to the rocket trajectory. As further discussed below, proper orientation of the antenna insures maximum reflected signal, particularly when the rocket length is resonant with the transmitter frequency. An antenna which was found suitable is shown in Fig. 1 and consists of a horizontally polarized half wave dipole with a director vertically stacked one-tenth wave length above it to provide a greater concentration of energy upward. It will be noted that antenna 20 is oriented to so that its elements lie in the same plane as the rocket trajectory. A separate receiving antenna is provided for each receiver. The receiving antennae must also be horizontally polarized and have good vertical sensitivity and minimum horizontal sensitivity in the direction of the transmitter. Likewise they must be oriented so that the rocket trajectory lies in their plane of polarization. The antenna for each of receivers 13 through 18 may have identical components and orientation to transmitting antenna 20 and are so shown in Fig. 1 where they are designated 13a through 18a respectively. Receivers 13 through 18 are each connected to one of a group of recorders designated 21 through 26 respectively. The firing switch 27 at the launcher 12 has associated with it a line to each of the recorders 21 through 26 so that the recorders may be simultaneously put in operation in synchronism with the firing of a rocket.

Figure 2:
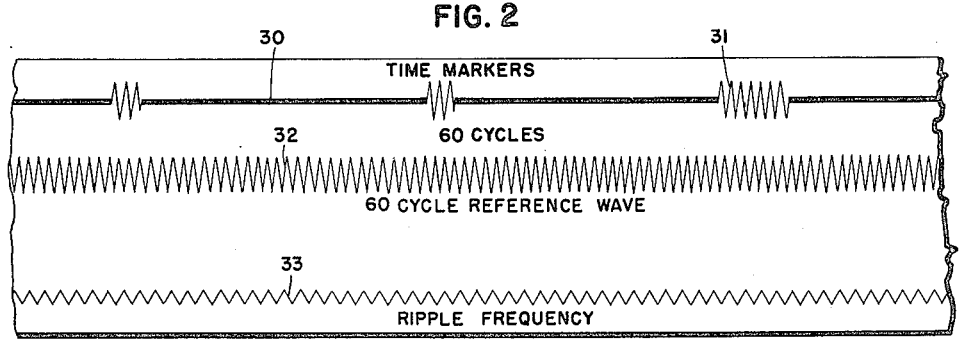
Fig. 2 is an enlarged view of a portion of a recorder chart from Fig. 1.

Each of the recorders is preferably a three pen traveling chart unit capable of making a chart such as shown in Fig. 2. It will be noted in Fig. 2 that one recorder pen records time markers as shown in the upper trace 30. The time markers are preferably recorded at half second intervals, every fifth second being denoted by a longer time marker shown at 31. The central trace 32 is a steady continuous sixty cycle reference wave. The bottom trace 33 is the ripple frequency taken from the recorder's respective receiver output.

In a preferred embodiment of this invention, the receiver is a Hallicrafter S–27 and the transmitter is operated at 75.4 megacycles at about 50 watts using a horizontally polarized dipole with one director. It is important to use a well filtered power supply to avoid any 120 cycle waves which might be confused with receiver ripple. It is also preferred to use a crystal controlled transmitter to avoid spurious ripple from transmitter frequency variation.

The relative positions of the launcher, the transmitter, and each of the receivers must be accurately surveyed and the respective distances considered in connection with the ripple frequencies recorded.

A doppler effect is observed in each receiver, which of course is tuned to the transmitter frequency, since each receiver is simultaneously detecting a 75.4 megacycles signal traveling horizontally from the transmitter to the receiver and a component of this signal reflected from the rocket. Inasmuch as the rocket is moving, the energy reflected thereby will be above or below the transmitter frequency depending on whether the rocket is moving toward or away from the particular combination of receiver and transmitter involved. The frequency shift in the reflected energy combined with the 75.4 megacycles from the transmitter produces a difference frequency, which may vary between zero and a few hundred cycles. This difference frequency is the recorded ripple frequency shown at 33 in Fig. 2. For any particular combination of the transmitter and a receiver, the frequency shift of the reflected signal, or the ripple frequency, will pass through zero when the rocket trajectory is tangent to an ellipse having the particular receiver and the transmitter as foci thereof.

The ripple frequency is determined simply by counting the number of undulations on the recorder chart between time markers or by comparing to the 60 cycle reference wave. During one cycle of ripple on each record, the rocket has moved so that the distance from transmitter to rocket plus distance from rocket to receiver, changes by the wave length of the operating frequency. Expressed mathematically, if the rocket coordinates are $x, y, z$; the receiver coordinates $x_R, y_R, z_R$, and the transmitter coordinates $x_T, y_T, z_T$: then, $$\sqrt{(x-x_R)^2+(y-y_R)^2+(z-z_R)^2}+\sqrt{(x-x_T)^2+(y-y_T)^2+(z-z_T)^2}=N\lambda$$

where N is the number of ripples on the record counting from the start up to time $t$ and $\lambda$ is the wave length of the transmitter frequency. Since N, $\lambda$, and the transmitter and receiver coordinates are known, the radius of $x, y,$ and $z$ are the only unknowns in the formula. Thus, by using three receivers, three expressions for the same unknowns may be obtained and the rocket coordinates for any instant in time may then be determined by simultaneous solution of equations. Thus it appears that three receivers would be adequate to pin point the rocket location at each instant in its flight, however, the use of six receivers as herein shown, not only produces a more accurate determination, but also considerably extends the range of observation. If only three receivers were used it would be necessary to record ripple frequencies on each during the entire portion of the rocket flight to be observed. On the other hand, by locating six receivers along the ground under the expected rocket trajectory, as long as the reflected signals are strong enough to be detected by any three receivers, the rocket flight may be observed. While the receivers need not be disposed in the same vertical plane as the rocket trajectory, as shown in Fig. 1, they should be dispersed along the range of the rocket flight.

In addition to determination of rocket position, the presence of yaw is detectable from the ripple record. The ripple amplitude is modulated in accordance with rocket yaw and therefore an estimate of the yaw angle can be made from the percent modulation of the recorded receivers signal together with a knowledge of the mean angle between the rocket axis and a line from the rocket to the receiver.

Figure 3:
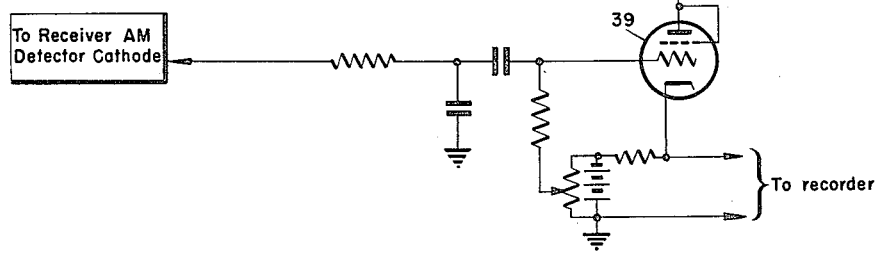
Fig. 3 is a detailed schematic diagram of a portion of Fig. 1.

The particular connections between each receiver and its recorder which were used in this invention offer several unusual advantages, accordingly the circuit is shown in detail in Fig. 3. It will first be noted that this connecting circuit permits copying off the receiver output without cutting into the receiver circuitry. It is only necessary to locate the 6H6 detector and wrap a lead on the AM detector cathode which is pin 8 for the circuit of the Hallicrafter S-27. The detector circuit is RC coupled into a cathode follower tube 39 which is preferably a triode-connected beam power tube such as a 6V6. An advantage offered by the direct connection to the AM detector instead of using the receiver audio amplifier for supplying signal to the recorder is the limiting action thus afforded as a safeguard to the recorder. In addition, this direct connecting to the detector permits the recording of lower ripple frequencies than would be passed by the receiver audio amplifier.

Selection of the transmitter frequency is an important feature of this invention. It is selected to give good reflections from the particular rocket being observed. This is accomplished by selecting a frequency which will render the rocket length substantially resonant such as at a half wave thereof. This careful frequency selection not only enhances the sensitivity and thus increases the range of the system, but also permits the system to distinguish between a rocket and its carriage which will be of a shorter length and fail to resonate with the transmitter frequency. Thus confusing ripple frequencies are avoided due to the falling carriage after its separation from the rocket. Actual tests have shown good signal reflection from 5″ rockets and from 3″ rockets carrying extension pipes without interference from the rocket carriages. However, no readable ripples were obtained from 3″ rockets without the extension pipes, thus proving that the shorter objects including the carriages were not reflecting sufficiently to produce ripple frequencies. While the actual tests described above were performed with rockets, the same principles will apply to guided missiles in distinguishing between the missile proper and its booster. Conventional tracking radars operate at too high a frequency to effectively distinguish between a rocket and its carriage.

Figure 4:
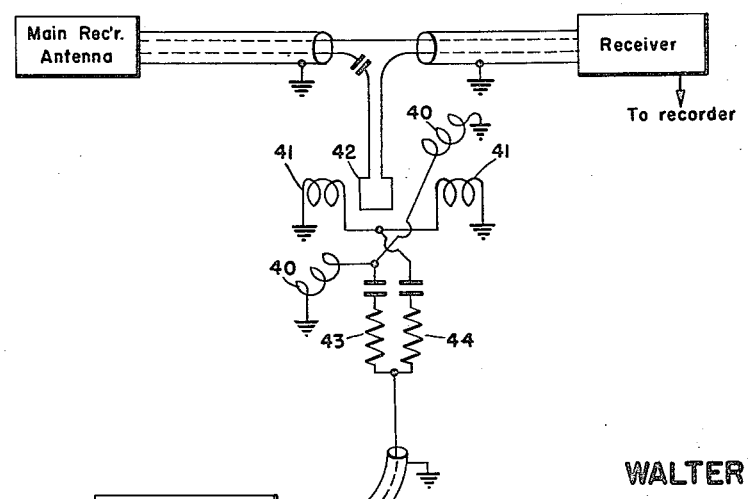
Fig. 4 is a schematic diagram of a variant embodiment of a position of Fig. 1.

Antenna design is also an important consideration since the direct radiation from the transmitter must not reach the receivers in such proportions as to overpower and obliterate the received reflected signals through A. V. C. action. In addition to the method described in connection with Fig. 1 of selecting receiving antennae which are insensitive in a horizontal direction as a means of minimizing the direct received energy, the same effect can be obtained by adding a second antenna to each receiver which is oriented to receive no reflected energy but only direct energy from the transmitter. The signal from this auxiliary antenna is fed to its respective receiver through the coupling device shown in Fig. 4. The coupling device includes a pickup coil 40 arranged for rotation and also withdrawal with respect to field coil 41 so that voltage of any phase and any amplitude up to a certain maximum, can be impressed on the receiver in series with the voltage from the main receiving antenna via pickup loop 42. This signal is adjusted in phase and amplitude by manipulation of coil 40 so that it will buck out all but the desired amplitude of direct pickup from the transmitter and thus provide maximum ripple signal in the receiver. The signal from the auxiliary antenna is coupled to coils 40 and 41 through RC phase shifting circuits 43 and 44 respectively. The condensers are chosen to give 45° lead in one pair of coils and 45° lag in the other. The resistors are of the noninductive type and high enough to make the circuits broadly resonant.

Obviously many modifications and variations of the present invention are possible in the light of the above teachings. It is therefore to be understood that within the scope of the appended claim the invention may be practiced otherwise than as specifically described.

What is claimed is:

A system for measuring the speed and course of a rocket comprising, a continuous wave transmitter tuned to resonate with the length dimension of the rocket, a horizontally polarized dipole antenna connected to the transmitter and oriented parallel to the horizontal component of the rocket trajectory, a plurality of receivers tuned to the transmitter frequency, an equal plurality of main receiver antennae each connected to a receiver and having its main lobe directed vertically upward but having sufficient horizontal sensitivity to pick up direct radiations from the transmitter, said transmitter and receiver antennae being dispersed below the expected rocket trajectory, the transmitter being centrally disposed with respect to the receivers nearest and furthest from the rocket launching location, a plurality of recorders each connected to one of said receivers for recording with respect to time the beat frequency of the direct and reflected energy at its respective receiver, means for synchronizing these recorders with the firing of the rocket to be observed, a plurality of auxiliary receiving antennae each disposed adjacent one receiver and oriented to receive only direct transmissions from the transmitter, a plurality of variable couplers each connected to one auxiliary antenna for controlling the phase and amplitude of the signal therefrom, and means introducing each variable coupler output to its adjacent receiver in series with the signal from that receiver's main antenna whereby an amount of direct transmission from the auxiliary antenna blocks out any excess received from the main receiver antenna so that maximum beat frequency is provided in the receiver.

References Cited in the file of this patent
UNITED STATES PATENTS

| | | |
|---|---|---|
| 2,462,102 | Istvan | Feb. 22, 1949 |
| 2,515,332 | Budenbom | July 18, 1950 |

OTHER REFERENCES

Doppler Tracking for Guided Missiles—Aviation Week, September 15, 1947.